United States Patent [19]

Regueiro

[11] Patent Number: 5,285,755
[45] Date of Patent: Feb. 15, 1994

[54] OPEN CHAMBER DIESEL ENGINE HAVING A PISTON WITH RECESSES THEREIN

[75] Inventor: Jose F. Regueiro, Rochester Hills, Mich.

[73] Assignee: Chrysler Corporation, Highland Park, Mich.

[21] Appl. No.: 28,003

[22] Filed: Mar. 8, 1993

[51] Int. Cl.$^5$ .............................................. F02B 19/16
[52] U.S. Cl. ............................. 123/193.6; 239/533.12
[58] Field of Search ............... 123/193.6, 193.4, 193.2, 123/193.1, 590; 239/533.2, 533.3, 533.12, 559, 589

[56] References Cited

U.S. PATENT DOCUMENTS

| | | | |
|---|---|---|---|
| 3,945,365 | 3/1976 | Regueiro | 123/191 |
| 4,069,978 | 1/1978 | ElMoussa | 239/533.2 |
| 4,111,177 | 9/1978 | Regueiro . | |
| 4,200,237 | 4/1980 | Urlaub | 239/533.12 |
| 4,284,043 | 8/1981 | Happel | 239/533.2 |
| 4,823,756 | 4/1989 | Ziejewski et al. | 239/533.2 |
| 5,038,732 | 8/1991 | Matayoshi et al. | 123/193.5 |
| 5,127,379 | 7/1992 | Kobayashi et al. | 123/193.5 |
| 5,129,381 | 7/1992 | Nakajima | 239/533.12 |
| 5,213,071 | 5/1993 | Iwata et al. | 123/193.5 |

FOREIGN PATENT DOCUMENTS

| | | | |
|---|---|---|---|
| 0096422 | 4/1989 | Japan | 123/193.6 |
| 0222815 | 10/1991 | Japan | 123/193.6 |

OTHER PUBLICATIONS

*Automotive Industries,* John McElroy, "Alternative Engines", Jan., 1980, pp. 43–48.
*Technology Review,* John Heywood and John Wilkes, "Is There a Better Automobile Engine", Dec. 1980, pp. 19–29.
*Automotive Engineering,* Stuart Birch, Jack Yamaguchi, Ali Demmier & Kevin Jost, "Vehicles/Engines", Jun. 1992, vol. 100, No. 6, pp. 46–47.
*Diesel & Gas Turbine Worldwide Catalog,* Dec. 1985 Edition vol. 50, pp. 1268, 1315, 1319, 1321.

Primary Examiner—Tony M. Argenbright
Assistant Examiner—M. Macy
Attorney, Agent, or Firm—Kenneth H. MacLean

[57] ABSTRACT

A four valve, double overhead camshaft open chamber diesel engine (10) has a combustion chamber (44) formed in part by a piston (18). The piston has an upper surface with recessed lobes (20) and (22). Each recessed lobe functions has a valve pocket for the intake and exhaust valves (32) and (42). A multihole fuel injector (70) has a discharge orifice (72, 74) angled toward the center of each lobe to spray separate fuel plumes into the respective recessed lobes (20, 22).

4 Claims, 2 Drawing Sheets

OPEN CHAMBER DIESEL ENGINE HAVING A PISTON WITH RECESSES THEREIN

TECHNICAL FIELD

The field of this invention relates to internal combustion engines, and more particularly, to diesel engines having a piston with recessed pockets and a multiport fuel injector.

BACKGROUND OF THE DISCLOSURE

Most modern highly refined four cycle diesel engines today, in the displacement range from 10 to 16 liters, run at about 2000 rpm with average piston speeds of about 2000 feet per minute. Most of the engines are used for over-the-highway longdistance hauling (class 8 trucks) with power outputs up to 400 to 450 BHP. At least in the United States, the engines utilize four-valve-per-cylinder designs. Some of these engines are also used for industrial, marine and construction equipment. Other than some much larger military industrial, generating and marine engines which have used four valves per cylinders practically since the end of World War II, these newer American engines are the only four-valve-per-cylinder large diesels in the world today, and are produced in relatively small numbers by only about five U.S. companies. In the rest of the industrial world (Europe and Japan) as well as in the U.S. for all other applications (class 7 and smaller trucks, agricultural, marine, industrial, buses, etc.) the bulk of production is based in old two valve technology. The situation is mostly due to the multiplicity of manufacturers (dozens) and the myriad of uses (as many as three to four thousand different models being available), as well as the very high costs of development, tooling and manufacturing new designs for such stratified markets.

In spite of these very real difficulties, great progress has been accomplished over the last 25 years, with the advent of the above-mentioned four valve engines, more modern combustion systems, turbochargers and lately, greatly improved electronically-controlled fuel injection systems. These newer engines deliver very high specific outputs and operate with better fuel consumption, lower visible and gaseous emissions and lower noise than their predecessors. These engines have increased reliability and durability as well as reduced oil consumption and extended periods between oil changes.

About 25 to 30 years ago, "swirl" (circular motion of the air charge rotating about the cylinder axis) was introduced, resulting in marked combustion improvements due to increased combustion speed. For the two valve engines of the time it was initially achieved by the use of valve "shrouds" (circular sections of metal welded to the underhead of the intake valves, with such valves prevented from rotation to insure the constant movement of air in the desired direction). Later, the intake ports were developed into a helical shape to achieve the rotational air motion of the air exiting the intake valves, said rotation continuing into the cylinder during the intake stroke as well as the exhaust stroke and well through the combustion and expansion portions of the cycle. All of the above two valve engines were of overhead valve construction design, with actuation by a single in-block camshaft through pushrods and rocker arms, with the valves in-line (the valve axis in a plane parallel to the crankshaft).

At about this time, some of the above-mentioned engines were converted to operate with four valves. The conversion consisted of new cylinder heads with two intake and two exhaust valves, still operated by pushrod and rocker arms but now with both intakes (and both exhausts) in planes transversal to the crankshaft ("across" valves), but with a new member in the form of a "T" bridge, mounted in a post between each pair of valves to allow the single rocker arm to operate both valves at the same time. Although with four valves the geometric air-flow capacity of the engine increased by 30 to 40%, such numbers never materialized for, first, with the "across" valves, the intake valves had to reach all the way across the cylinder head with a very sinuous port and second, because the port further downstream also had helical features to enhance swirl. These two less-than-streamlined approaches significantly reduced the potential increases in air flow, with the final numbers being roughly half of the possible 30 to 40%. The same situation existed with the exhaust ports, except that their aerodynamic characteristics were better for there was no need to induce any air motion with helical features. And so, the final improvements in air flow and swirl were well received and continue essentially unchanged to this day.

The smaller valve size used in four valves design should have resulted in significantly smaller valve stems, springs and retainers. However, no decrease in weight occurred because the "T" bridge itself adds more weight than what is saved on both valves served by each bridge. The dynamic weight of the valve train continues to be as high as it was with the former two valve cylinder heads, and the valve springs are essentially, as stiff, therefore; no improvements were realized on valve train friction and power consumption. With four valves, however, the valve seat bridges, all four of them (as compared to a single bridge for two valve heads) are shorter, stronger and better cooled and, being located roughly halfway from the head center toward the peripheral wall of the bore, are also mechanically less prone to flexing than the single bridge of two valve heads, which, being located nearly on the center of the bore can tend to flex more, contributing to increased valve wear and possible cracking of said bridge. Besides, with two valve heads, for air flow reasons, there is great pressure to make the valves as big as possible, sometimes to the detriment of the bridges or the valves themselves. With four valve technology, and all the increases in air flow provided by larger valve flow areas, the design can be a little more focused towards optimum bridge size, strength and cooling.

Four valve designs also provide for optimum location and position for the fuel injector, nested between all four valves substantially in the center of the head along a vertical axis which is substantially the same or very close to the cylinder axis. The injectors for four valve engines provide a symmetrical injection pattern and a piston bowl concentric to the cylinder diameter, both of which are directionally correct for good mixing and reduced wall-wetting. With the offset, angled injector used with two valve engines, it is very difficult to obtain an even, symmetrical pattern because of complications relating to the hole drillings at the nozzle. While the injector hole geometry may be difficult, it is not impossible to achieve an acceptable compromise even with these compromises for two valve engines. However, it is impossible to center the bowl and the cylinder diameter, resulting in more plume impingement and wall wetting on the bowl walls on the side closer to the injector holes. For these and other reasons, most internationally marketed two valve engines favor a smaller-diameter, deeper bowl than the shallow, large diameter bowl.

Four valve head engines with the smaller valve head sizes, also allow more design flexibility on valve lift, timing and opening duration. It is a general rule that at lifts above 25% of valve head size at least for intake valves, the valve opening area ceases to be the main flow-controlling factor and the port throat area becomes the restrictive flow controller. Although in some cases this rule of nature can be bent, it cannot be broken, for, depending on the streamlining and aerodynamics of the ports sometimes it is possible to use lifts higher than 25% of diameter for intake valves, at least with turbocharged engines. But 25% is a good base for discussion, and it indicates that the smaller valve sizes of four valve heads can also have reduced physical lifts while still providing, both valves combined, greater air flow than a single larger valve with higher lift.

Due to valve train dynamics, a two valve head system, running at the same frequency (i.e. same engine rpm) as a four I5 valve head, requires, at the same forces and accelerations, more time to reach their maximum lift, in other words, more degrees of crankshaft rotation. This mechanical requirement, plus the fact that, in most cases, two valve engines at high speed must make-up through extended valve duration the air flow that they lack from lifted area, generally result in valve opening durations which are longer than is required with the four valve constructions. In reality then, the intake valve opens much earlier than piston TDC (top dead center) and closes well past BDC (bottom dead center), and the exhaust opens earlier in the expansion stroke, well before BDC and closes late in the following intake stroke, well past TDC. The "overlap" around TDC during the scavenging portion of the cycle, when the intake valve opens early and the exhaust closes late is necessary to provide sufficient real time in the gas-exchange process to allow complete evacuation of the spent exhaust gases through the exhaust system as well as to allow the column of intake air, which also has inertia, to start moving early into the cylinder so that maximum valve lift occurs shortly after the point of maximum piston speed to allow the valve to close as soon as thermodynamically and mechanically acceptable after BDC.

Concurrently, and for the same mechanical force and acceleration requirements which force the extended durations of the exhaust period, on most two valve designs the exhaust valve opens earlier than thermodynamically advisable, wasting energy to the exhaust and raising the exhaust temperature (and also the valve temperature) and imposing very large forces on the valve train trying to open the valve against still high cylinder pressures.

By simple geometry, it is easy to see that the late intake closing, well past BDC, results in a reduced effective compression ratio, in some cases much lower than the nominal design ratio. Assuming that, at high speed, through turbocharging, for example, air is still or has just ended entering the combustion chamber due to turbo discharge pressure or the inertia of the air column, as the speed is decreased to the lower ranges, because of lower inertia of the air column and/or lower boost pressure, the intake valve closes later than the point at which air has ceased to enter the cylinder, and the piston is already far past BDC and moving rapidly into the compression stroke, in this case pushing part of the air charge already admitted back into the intake manifold. This condition not only wastes energy twice in admitting then "spitting-back" that part of the air charge, but also reduces the potential volumetric efficiency, which, coupled to the reduced effective compression ratio, results in lower compression pressure and temperature near TDC at the point of injection. The lowered compression temperature results in noisy and inefficient combustion, with high gaseous emissions (particularly $NO_x$, due to the early combustion and the richer air/fuel ratio), smoke, and particulates.

The longer fuel chemical delay time, the extra fuel injected during such delay, the rapid raise of pressure and temperature of so much fuel essentially igniting all at once, the increased wall wetting during slower speeds provides combustion complications. Couple these conditions to a cold start situation, with the engine cranking at 100 to 150 rpm, and the reasons why some engines start so poorly become very clear: lack of air, low pressure and temperature both from low trapped volumetric efficiency and low effective compression ratio, energy wasted in pumping the air in and "spitting" it back. Four valve designs with lower lift and shorter durations, with valve events closer to TDC and BDC go a long ways towards correcting these inherent problems of two valve designs.

During the last ten years, continued combustion research and improvements in fuel injection systems (higher pressures and electronic timing control, in some cases both beginning and ending of injection), have produced further positive results. Smaller nozzle holes, higher fuel pressures and longer injection duration have been, essentially, shifting the responsibility of mixing the air and fuel from the air motion and energy (swirl) to fuel energy. The smaller injector holes produce less fuel penetration and impingement of the fuel plume against the piston walls (wall wetting), producing a finer mist and keeping the fuel droplets airborne, making it easier to mix with the fuel. Better injection system controls, which have resulted in sharp and clean ends-of-injection tail ends (a notorious cause of visible and gaseous emissions and increased fuel consumption), have allowed an extension of the useful injection period into what formerly was the tail-end of injection. This extended injection duration, the improved mist and shorter fuel plume, the reduced wall-wetting and reduced tail ends have actually lessened the dependency on "swirl" air motion, and by reducing it thus, the air flow has increased. The net results have all been positive to power output, emissions, fuel consumption and noise.

For optimum operating conditions, as well as for maintaining the high compression ratios required (mostly for cold startability) the pistons must come very close to the cylinder head and with extended valve overlap periods, valve cut-outs or pockets must be machined on top of the piston to avoid the valves and pistons from hitting each other. The situation is less critical with four valves, for the pocket depth is less, but then four cut-outs exist rather than two. These cut-outs not only interfere with the air swirl, diminishing it, but during combustion are not really part of the bowl, but "inactive" volumes, particularly as applied to engines using deep bowls and effectively hamper the combustion process, especially during cold start for the air mass favors the colder sections of the chamber, density being an inverse function of temperature. Since the valve pockets or cut-outs are relatively shallow and offer high surface to volume ratios, the air temperature thereabouts is lower than inside the bowl, which negatively affects the density ratios, placing too much air in the inactive areas and not enough in the bowl where it is supposed to be to meet the incoming fuel. Swirl, no matter how good and well-matched it may be to the engine requirements while running full-load at rated speed, is totally inexistent at starting speeds and makes no contribution to mixing or combustion. Finally, and especially during the last decade, great improvements have been made on very modern sparkignition automotive engines featuring four valves for optimum air flow and direct-acting double-overhead camshafts set on a narrow valve included angle (V.I.A.). The engines offer an extremely light and mechanically stiff valve train, with low spring forces and low power consumption, with short valve durations and more judicious valve timing points near TDC and BDC, with each camshaft operating its own bank of intake or exhaust valves for a true cross flow design and with a central source of ignition. And with such engines developing the honest 40% improvement in power offered by their corresponding increases in valve air flow area, while improving effective compression ratios, combustion smoothness and noise and greatly reducing gaseous emissions as well as improving startability.

What is technically needed by future advanced diesel engines are engines featuring the modern trends of smaller sparkignition automotive engines: namely, four valves with no porting compromises for maximum air flow, direct acting, stiff yet lightweight valve trains with low power consumption and improved dynamics to allow the lighter valves to operate faster but with reduced durations for a higher ratio of effective to nominal compression ratios, with a narrow V.I.A. to allow better air flow but mostly to permit the installation of bulkier but more modern fuel injection systems substantially in the center of the head. A piston incorporating special combustion chamber requiring no swirl and combining the necessary valve pockets into active areas of the combustion chamber, such as to allow the maximum possible amount of air to participate in the active combustion process for improved combustion and startability under all conditions, for lower emissions, noise and improved fuel consumption. What is also needed is to provide all of the above-mentioned design benefits and coupling them to a novel injector-hole diffuser approach which provides a wider, less penetrating plume even with increased fuel injection pressures for yet additional benefits in misting, fuel droplet size, mixing and burning with more airborne fuel.

SUMMARY OF THE DISCLOSURE

In accordance with one aspect of the invention, an internal combustion engine has a cylinder and a piston reciprocally movable in the cylinder used in conjunction with a four-hole fuel injector. A cylinder head is secured over the cylinder and piston to form a combustion chamber. At least one intake duct and preferably two, extend through the same side of the cylinder head to form the appropriate intake ports, and an intake valve is mounted at each port through the cylinder head for allowing air to be admitted into the combustion chamber. At least one exhaust duct, preferably two, extends through the same side of the cylinder head (on the opposite side to the intake ducts), forming the appropriate exhaust ports and an exhaust valve is mounted at each port through the cylinder head for allowing exhaust gases to exit the combustion chamber. The valves are preferably actuated by directly operated twin overhead cam shafts. The valve included angle should be shallow, from 0° to approximately 30°.

The piston may be flat or domed, i.e., higher in the center than on the sides. The angle of the dome is preferably similar to the valve included angle and the pentroof angle of the fire deck of the cylinder head. The piston has four recessed lobes in its top surface circumferentially spaced about a central axis of the piston.

A fuel injector is substantially centrally mounted at an upper surface of the combustion chamber, its axis substantially parallel to the cylinder axis. The fuel injector has a plurality of diverging fuel passages preferably circumferentially spaced about a central axis of the engine cylinder. Each passage is tapered to the larger open end leading to the combustion chamber. The longitudinal axis of each fuel passage at the larger end is substantially aligned with a central area of a respective recessed lobe. Each intake and exhaust valve is vertically aligned over a respective recessed lobe and sized to fit within the recess lobe when in the partially open position when the piston is near TDC to provide more overlap. In one embodiment, the fuel passages that are aligned with the center of the recessed lobes under respective intake valves have a greater diameter than the fuel passages that are aligned with the recessed lobes under the respective exhaust valves. In another embodiment, the lobes in cross section, have a minimum depth at the outer periphery of the lobes just sufficient to allow proper valve operation without crashing into the pistons. For enhanced combustion, the lobes, all of them or just the ones under the intake valves, may be dished to be deeper at their center.

BRIEF DESCRIPTION OF THE DRAWINGS

Reference now is made to the accompanying drawings in which.

DETAILED DESCRIPTION OF THE PREFERRED EMBODIMENT

Figure 1:
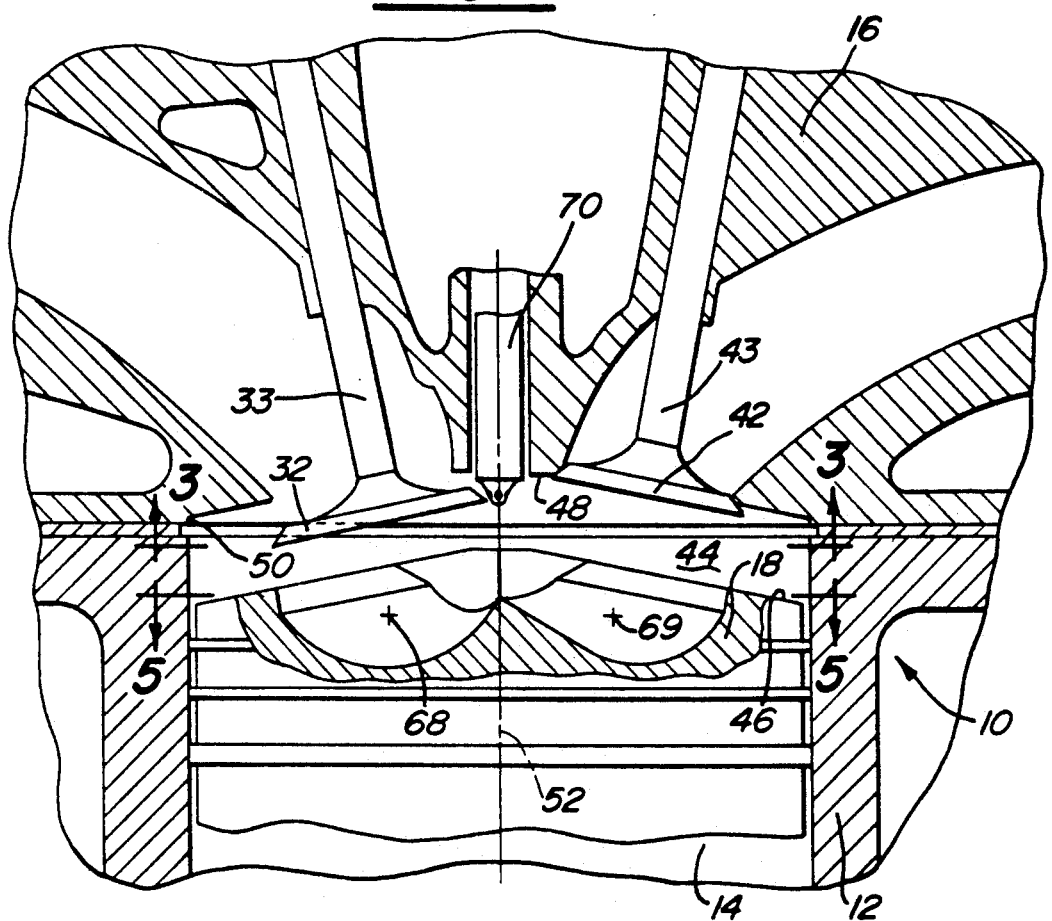
FIG. 1 is a segmented side elevational view of a cylinder and piston assembly for a diesel engine during an intake stroke illustrating an embodiment of the invention.

Referring now to FIG. 1, an internal combustion engine 10 includes a cylinder head 16 and an engine block 12 with at least one cylinder 14 and at least one piston 18. Only one cylinder 14 and piston 18 are shown with the understanding that any other cylinder and piston in the engine 10 are substantially identical in structure and function, and therefore, are not individually described. A cylinder head 16 is mounted on block 12. Each piston 18 is conventionally connected to a crankshaft through a conventional piston pin and a connecting rod. The crankshaft is connected via a timing mechanism (gears, chains or belts) to twin overhead camshafts that operate the intake valves 32 and exhaust valves 42. The connecting rods, crankshaft, timing mechanism, overhead camshafts and other valve train components are conventional and therefore for simplicity of the drawing are not illustrated.

A pair of intake valves 32 and exhaust valves 42 are associated with each cylinder 14. Reference to direction such as top, bottom, up, down, vertical, or horizontal will be made relating to the engine as shown in FIG. 1 with its conventional arrangement for a motor vehicle. It should be understood that the engine itself may be repositioned or reoriented such as rotated about its longitudinal or transverse axis without affecting the invention.

The cylinder 14, piston 18, and cylinder head 16 form a combustion chamber 44. The piston 18 has a top surface 46 that defines the bottom wall 46 of the chamber 44. The cylinder head 16 forms a top surface 48 of the chamber 44. The cylinder 14 and cylinder head 16 together form the side wall 50 of chamber 44. The longitudinal central axis of the cylinder 44 is indicated at 52. The piston 18 has a ring pack 54. The cylinder head 16 has intake ports 56 and exhaust ports 58 in communication with the respective pair of intake valves 32 and pair of exhaust valves 42. The valves 32 and 42 have a maximum valve included angle of less than 30° and is preferably approximately 20°-25° as shown in FIG. 1.

Figure 5:
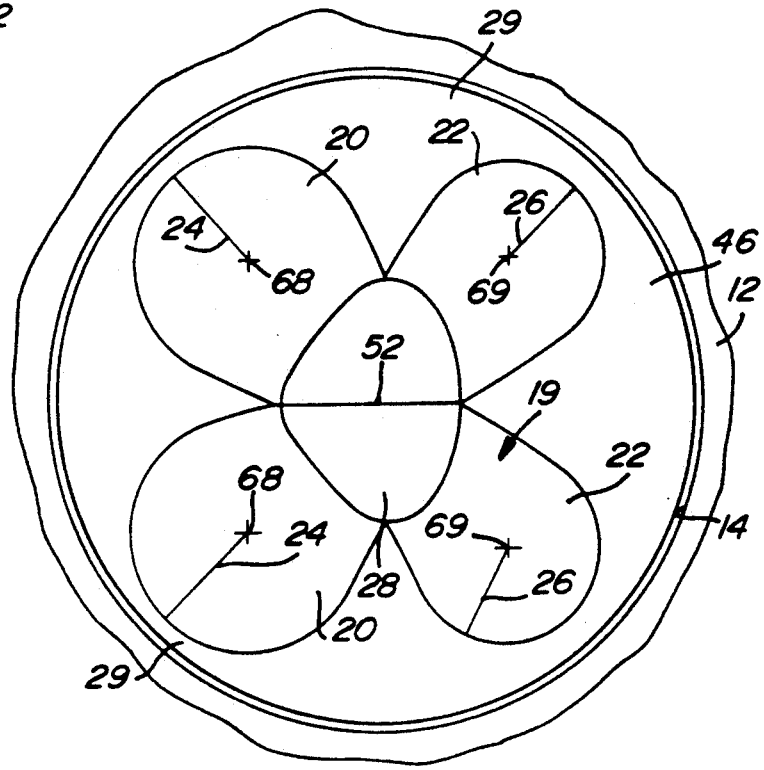
FIG. 5 is a cross-sectional view taken along lines 5—5 in FIG. 1.

As shown in FIGS. 1 and 5, the piston surface 46 is domed in cross-section to conform to the pentroof angle of the head 16 and has a recessed area 19 that resembles a clover leaf shape. The recessed area 19 has four recessed lobes 20 and 22 circumferentially spaced about central axis 52 as clearly shown in FIGS. 1 and 5 that function a valve pockets and as part of the combustion chamber. Two recessed lobes 20 have a radius 24. The recessed lobes 20 are located and sized to receive the intake valves 32 when the valves are in the partially open position and the piston 18 is at or near TDC (during the overlap portion of the cycle). The other two recessed lobes 22 have a radius 26. The recessed lobes 22 are located and sized to receive the exhaust valves 42 when the valves 42 are in the partially open position and the piston 18 is at or near TDC, also during the overlap portion of the cycle.

The piston has a generally circular horizontal crosssection and the lobes 20 and 22 are circumferentially spaced about at roughly 90 degree intervals about the central axis 52. Recessed lobes 20 are larger than recessed lobes 22. The outer periphery of each lobe 22 and 24 is just deep enough to receive the respective valves when in the partially open position during overlap. The stems 33 and 43 of the respective valves 32 and 42 are aligned with the centers 68 and 69 of the lobes 20 and 22 such that the valves 32 and 42 are received normal to the plane of the recessed lobes 20 and 22. The angle of the lobes is such that the stems 33 and 43 of respective valves 32 and 42 are transverse to the general plane in which the lobes lie. The centers 68 and 69 may be concavely dished to be deeper than the peripheries of lobes 22 and 24. It is foreseen that in certain applications, it is desired to machine the recessed lobes with flat bottoms. Each recessed lobe 20 and 22 is joined in a common recessed center area 28 located at the central longitudinal axis 52. Whether the lobes have flat bottoms or concavely dished bottoms, the recessed lobes 20 are preferably configured to have a greater volume than lobes 22. The recessed lobes 20 and 22 and central area 28 have preferably just enough depth to provide valve head clearance and minimize fuel plume impingement on the walls of the lobes while maintaining the plume airborne.

The piston periphery section 29 forms a squish area 31 of the combustion chamber 44 with the surface 48 of cylinder head 16. The squish area 31 allows more volume to be adjudicated to the lobes 20 and 22 and promotes rapid air motion into said volumes as the piston reaches TDC on its compression stroke for faster mixing and burning in the four lobes.

Figure 4:
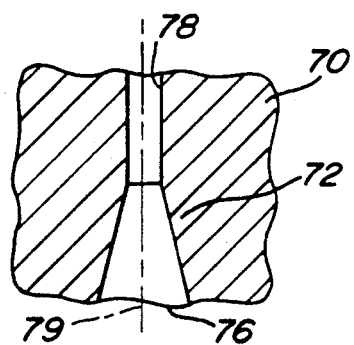
FIG. 4 is a cross-sectional view taken along lines 4—4 in FIG. 3.

A multihole fuel injector 70 is mounted in the cylinder head 16 along vertical axis 52 The fuel injector 70 preferably has two nozzle discharge orifices 72 and two smaller nozzle discharge orifices 74. Orifice 72, as shown in FIG. 4, is preferably diverging such that its lower open end 76 has a greater diameter than its upper section 78. Orifice 74 is preferably similarly shaped as orifice 72 except that it has a smaller overall diameter. The orifices 72 by having large diameter than orifices 74 deliver more fuel to lobe section 20 than ports 74 deliver to lobe sections 22. The quantity of delivered fuel to lobes 20 and 22 is preferably equal or larger to the proportion of the volume of recessed lobes 20 and 22. The orifices 72 and 74 preferably are circumferentially spaced about central axis 52 at approximately 90° intervals.

Figure 2:
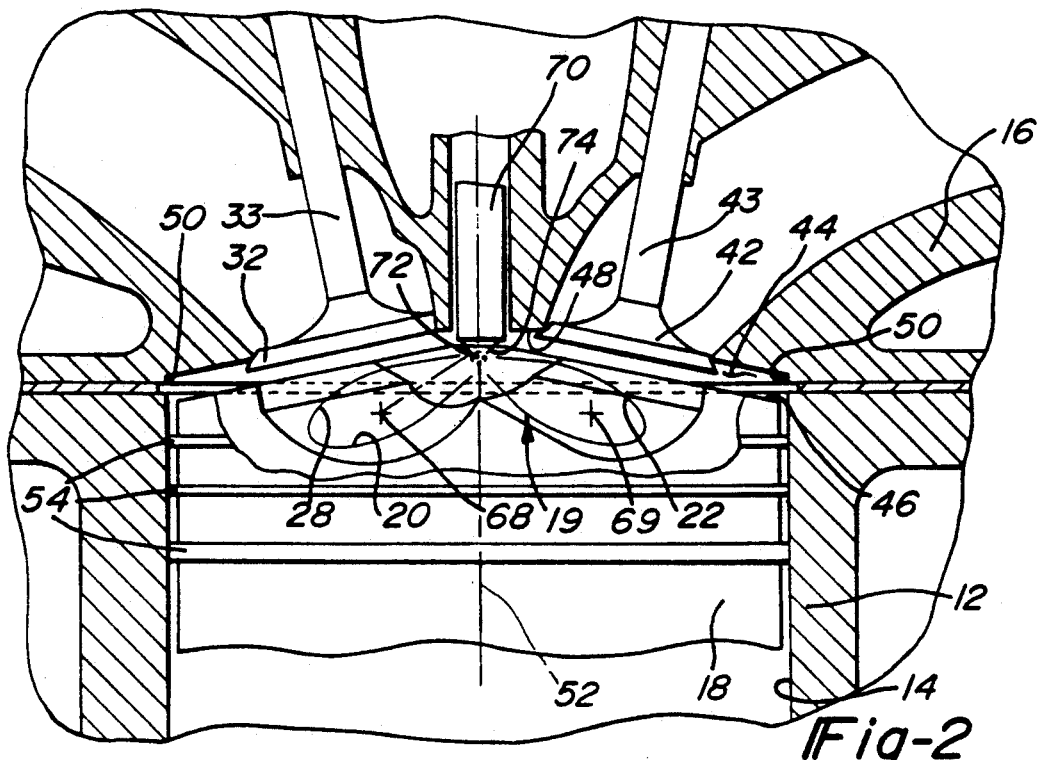
FIG. 2 is a view similar to FIG. 1 illustrating the piston during the compression stroke near TDC.
Figure 3:
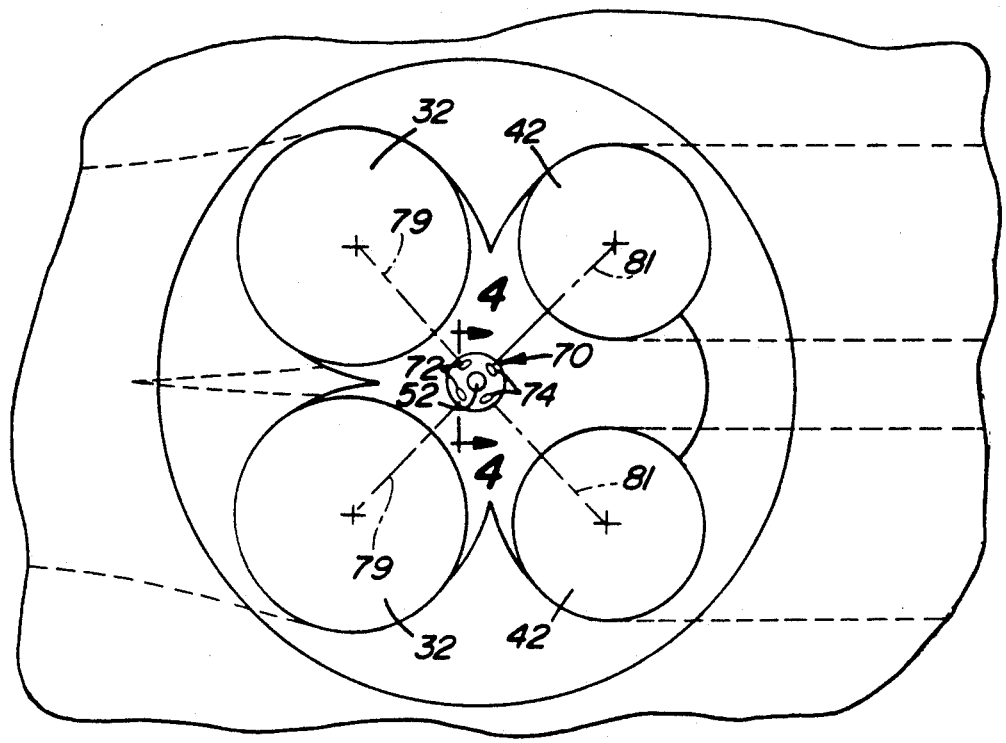
FIG. 3 is a cross-sectional view taken along lines 3—3 in FIG. 1.

The central axis 79 of each orifice 72 is angled radially outwardly and downwardly such that it is aimed toward the center section 68 of lobes 20 while the central axis 81 of each orifice 74 is similarly angled to be aimed toward the center section 69 of lobes 22. When the piston 18 is near TDC, as illustrated in FIG. 2, such that the fuel plumes 83 and 85 from orifices 72 and 74, respectively, remain substantially airborne before ignition and during combustion.

The nozzle or valve that is associated upstream from each orifice 72 and 74 may be a conventional needle type valve that has throttling characteristics which reduce the amount of fuel injected during the delay period resulting in both a shorter delay and smoother, quieter combustion with reduced gaseous emissions ($NO_x$ especially).

In operation, at the end of the exhaust stroke and the beginning of the intake stroke, both the exhaust valves 42 and intake valves 32 may be partially opened during an overlap period. At this time, the piston 18 is at or near TDC and its periphery 29 and areas not recessed with lobes, forms squish area 31 with the upper chamber surface 48. The opening and closing of the valves is not affected because the valves 32 fit within lobes 20 and exhaust valves 42 fit within lobes 22.

During the intake stroke as illustrated in FIG. 1, the intake valves 32 eventually open to their maximum lift. The valves 32 are as large as practical to lessen any air resistance to provide the most air to enter the cylinder and increase the volumetric efficiency of the engine. One of the advantages of the preferred embodiment with small V.I.A. is that the larger valves associated with any kind of pentroof chamber, when opened, have their heads move away from the cylinder walls, which allows flow out of the port on the backside of the valve, something which valves set at 0° V.I.A. (all stems vertical) cannot do.

During the compression stroke as illustrated in FIG. 2, as the air is compressed, the air passing into the lobes 20 is cooler and denser than the air compressed into the lobes 22. The air is heated by two functions. First, the air is heated as it is compressed by the action of the piston. The heating of the air and air movement about the combustion chamber due to the squish action, coupled to the enhanced injection characteristics, improve (break-up) the mixing of the fuel particles injected into the combustion chamber 44. Secondly, the air draws heat off the hot exhaust valves and surrounding areas.

The intake valves 32 are normally cooler than the exhaust valves 42 due to the fact that cool intake air is constantly cooling the intake valves 32 during the intake stroke while on the other hand hot exhaust gases are constantly heating the exhaust valves 42 during the exhaust stroke. The air within the two lobes 20 is closer to the cooler intake valves 32 while the air within the two lobes 22 receives substantial heat radiation from the exhaust valves 42. Consequently, the air within the lobes 22 is heated and expands. Conversely, the air within the lobes 20 is denser and cooler than the air in the two lobes 22. With cross-flow four valve cylinder heads as described, the construction of the inlet ports may be easily designed to produce air tumble about a horizontal axis in the cylinder which may be desired in certain applications. The air tumble may be used to enhance the burn velocity. Experience has shown that air tumble generation by means of proper port design on cross flow heads does not detract from air flow as much as swirl generation obtained with four valve heads with "across" valves.

It is desired that the lobes 20 be larger than the lobes 22 not only because normally the intake valves 32 are larger than exhaust valves 42 but to take advantage of the thermal differences between the lobes 20 and 22. The nozzle discharge orifices 72 and 74 ar aimed such that the larger fuel plumes 83 travels toward the lobes 20 with the denser cooler air. The smaller fuel plumes 85 travel toward lobes 22. The fuel and burning mixture staying airborne, with minimum contact with the chamber top bottom or back wall (in sharp contrast to conventional diesel engines), it is, apart from a low smoke, HC and particulate generator, also a low $NO_X$ producer. The fastest combustion is then produced with the lowest thermal loading on any section of the piston to prevent heat checking and cracking of the piston crown.

The decreased thermal loading may help to, in some cases, eliminate or reduce the need for piston cooling oil jets which produces savings in both engine production costs and engine operating costs. Piston cooling oil jets require a larger oil pump with increased power consumption, and contribute to increase ring and piston friction as well as oil consumption. The elimination of the cooling jets can provide for improved piston and liner, or cylinder wall, oil drainage and reduced oil consumption, as well as allowing for lowered tension piston rings. Secondly, the oil pump may be reduced in sized and the power demand of the oil pump is reduced. A significant increase in power, fuel efficiency and a decrease in specific $NO_X$ and HC, ring and cylinder wall wear, are a result of applicant's piston and nozzle discharge orifice design, combustion chamber construction which provides for more efficient combustion and thermal loading.

The combination of the combustion chamber, piston with recessed valve-receiving pockets, multi-valve porting of each cylinder and fuel injector orifice design provides for a diesel engine which can be easily modified for specific applications. Due to the redundancies built into the design in allowing shorter durations of valve opening or allowing earlier valve openings and closings into the piston pockets, the engine calibrations can be modified in a variety of ways. In all cases, startability, driveability, noise and emissions during and immediately following cold start are greatly improved.

Variations and modifications are possible without departing from the scope and spirit of the present invention as defined by the appended claims.

The embodiments in which an exclusive property or privilege is claimed are defined as follows:

1. In an open chamber diesel combustion engine having a cylinder and a piston movably disposed in said cylinder for reciprocal motion, a cylinder head secured over said cylinder and piston to form a combustion chamber, a pair of intake ports extending through said cylinder head and an intake valve operably mounted in each respective intake port for allowing air to be admitted into said combustion chamber, and a pair of exhaust ports extending through said cylinder head and an exhaust valve operably mounted in each respective exhaust port for allowing exhaust gases to exit said combustion chamber; the improvement characterized by:

a multihole fuel injector nozzle tip having a plurality of radially diverging discharge orifices for spraying a plurality of fuel plumes into said combustion chamber;

said piston having a plurality of recessed lobes circumferentially spaced about a central axis of said piston; each recessed lobe being substantially aligned with respect to a respective discharge orifice to receive a respective fuel plume;

each intake and exhaust valve being aligned along its stem axis over a respective recessed lobe and sized to fit within said recessed lobe when in the partially open position and when said piston is at or near TDC.

2. A diesel combustion engine as defined in claim 1 further characterized by;

each intake and exhaust valve having its respective valve stem aligned transversely with the plane of the aligned recessed lobe.

3. A diesel combustion engine as defined in claim 2 further characterized by:

the respective recessed lobes aligned under said respective intake valves being larger than the respective recessed lobes aligned under said respective exhaust valves;

the respective nozzle discharge orifices aligned with said respective recessed lobes under said intake valves having a larger diameter than said respective discharge orifice aligned with said recessed lobes aligned under said exhaust valves.

4. A diesel combustion engine as defined in claim 1 further characterized by;

the respective recessed lobes aligned under said respective intake valves being larger than the respective recessed lobes aligned under said respective exhaust valves;

the respective nozzle discharge orifice aligned with said respective recessed lobes under said respective intake valve having a larger diameter than said respective discharge orifice aligned with said recessed lobes aligned under said respective exhaust valve.

* * * * *